April 14, 1970  P. COACKLEY  3,506,562
DEWATERING OF SLUDGE
Filed Dec. 5, 1966  3 Sheets-Sheet 3

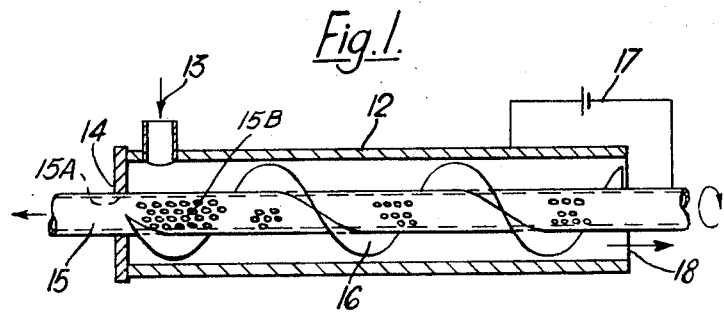
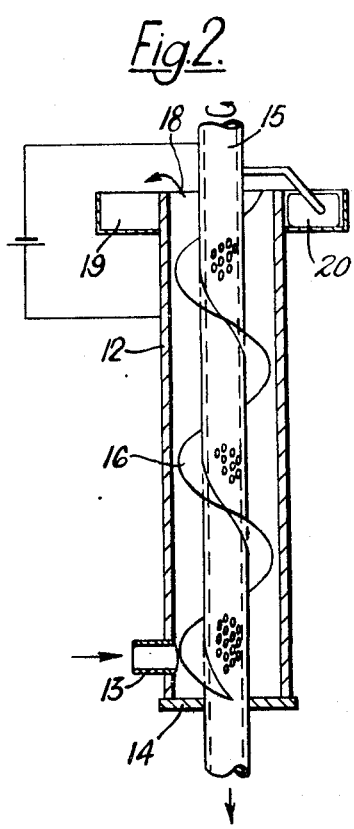
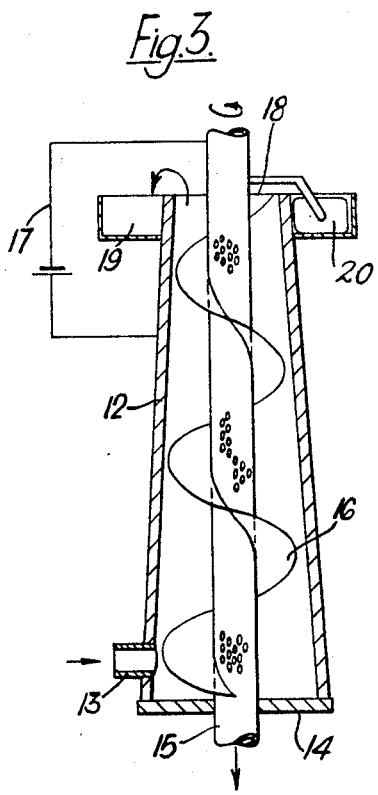

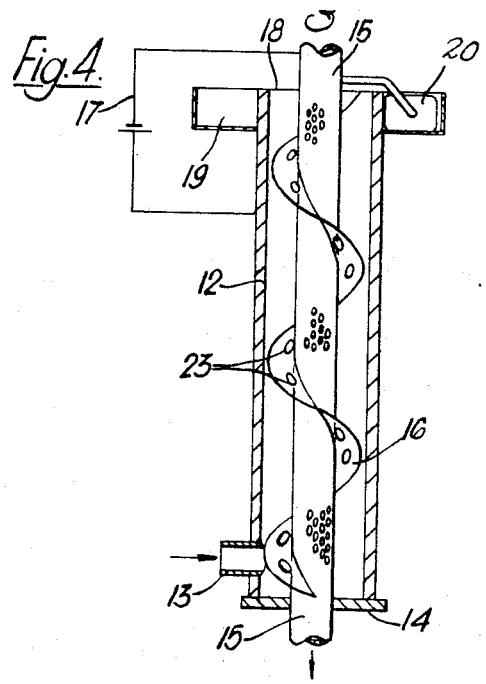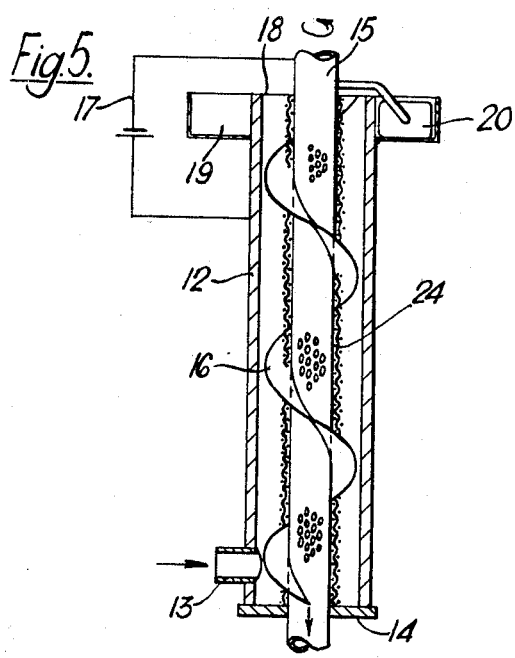

Inventor
PETER COACKLEY
By Young & Thompson
Attorneys

United States Patent Office 3,506,562
Patented Apr. 14, 1970

3,506,562
DEWATERING OF SLUDGE
Peter Coackley, Buxworth, England, assignor to The Motherwell Bridge and Engineering Company Limited, Motherwell, England, a British company
Filed Dec. 5, 1966, Ser. No. 599,165
Int. Cl. B01c 35/06; B01d 35/06; B01k 5/00
U.S. Cl. 204—300                                    6 Claims

ABSTRACT OF THE DISCLOSURE

Apparatus for use in continuously dewatering sludge by means of electro-osmosis consists of an anodic casing, a rotary perforated cathode wall extending within the casing, and blading on the rotary wall to be driven by the wall, so that the sludge is continuously propelled through the casing from an inlet to an outlet in the casing, and the water flows electro-osmotically to the perforated rotary wall for continuous discharge through the perforations thereof.

---

This invention relates to the apparatus for use in dewatering sludge

The invention may have other applications for example such as draining slits, boulder clay suspensions, and peat. Reference will be made hereinafter and in the claims only to the dewatering of sludge, but it is intended that other uses be covered by the present invention and that the term sludge include slurries.

It is an object of the invention to provide simple dewatering apparatus capable of dealing quickly and efficiently with relatively large quantities of sludge.

According to the present invention, apparatus for use in dewatering sludge includes an elongated electrode casing having inlet and outlet openings therein, a hollow elongated electrode device extending within the casing and including a rotary wall defining with an opposed wall of the casing an elongated through-passage for sludge, the rotary wall having perforations therein to permit flow of water from the sludge into the hollow of the device for discharge from the hollow, and blading carried by the rotary wall so as to be driven thereby to convey sludge through the passage from inlet opening to outlet opening, the rotary wall and the opposed wall being adapted to serve respectively as cathode and anode and being electrically insulated from each other so that on applying a difference in electrical potential across the passage there is an electro-osmotic flow of water from the sludge through the perforations of the rotary wall during movement of the sludge through the passage, and the driven blading prevents the accumulation of dry solids on the opposed wall.

Preferably, the elongated electrode casing is tubular and has the inlet and outlet openings at its respective ends, the electrode device includes a tube mounted for rotation on its axis and having the perforations in its wall, and the blading is a helical blade carried coaxially by the tube for rotation therewith, and electrically insulated therefrom.

Embodiments of the invention will now be described by way of example with reference to the accompanying diagrammatic drawings in which:

FIG. 1 is a sectional side view of horizontally disposed sludge-dewatering apparatus.

FIG. 2 is a sectional side view of a vertically disposed sludge-dewatering apparatus.

FIGS. 3 to 5 are sectional side views of modifications of the apparatus of FIG. 2.

FIG. 6 is a top plan view of sludge-dewatering apparatus embodying units according to any of FIGS. 2 to 5.

FIG. 7 is a sectional side view of an alternative form of horizontally disposed sludge-dewatering apparatus.

Referring to the drawings:

In FIG. 1, sludge is dewatered in an apparatus comprising an elongated cylindrical electrode casing 12 which is positioned with its axis horizontal and has at one end a plate 14 and a sludge inlet opening 13 and at the other end a solids outlet opening 18; a hollow elongated electrode device in the form of a rotary tube 15 extending co-axially within the casing and bearing in the plate 14; a helical blade 16 carried by the tube 15 so as to be driven thereby to convey the sludge through the elongated annular through-passage defined by opposed longitudinal faces of the casing 12 and the tube; and perforations 15B in the rotary tube wall opening into the tube bore 15A. The rotary tube wall and the opposed wall of the casing 12 are adapted to serve respectively as cathode and anode to create an electro-osmotic effect across the passage.

In operation of the apparatus separated water passes into and through the tube 15, and flows out of the end of the casing 12 opposite from the outlet end 18 towards which the sludge is moved by the blade 16.
and casing in that it is epoxy or polyester resin or is The helical blade 16 is electrically insulated from tube and casing in that it is epoxy or polyester resin or is painted with a polyurethane paint.

In operation of the apparatus a potential is applied to the two electrodes 12 and 15 by a circuit 17, and the sludge charge is passed into the casing 12. The tube 15 is rotated, either manually or under power, and the sludge is moved by the helical blade 16 towards the open end 18 of the casing 12. As axial movement of the sludge continues, the water is separated from the solids by electro-osmosis and is discharged from the casing at the inlet end thereof by passing through the perforations 15B and bore 15A of the tube 15.

As the sludge is continually moved axially through the casing 12, and the inner face of the casing is swept by the blade 16, the undesirable formation of deposits, particularly of a layer of dry solid material, at the anode 15 is obviated. Moreover, the continual churning movement of the sludge also tends to prevent formation of deposits on the anode.

In FIG. 2 the cylindrical casing 12 is disposed with its axis upright, and the solids outlet 18 is at the upper end of the casing. The outlet 18 is surrounded by an annular receptacle 19 adapted to receive solids therefrom. The receptacle 19 has on its floor a discharge opening (not shown) and houses a rotary scraper 20 which is in driving connection with the rotary tube 15 and sweeps the solids to the opening and discharges them therethrough. Separated water passed through the perforated wall of the tube 15 and then flows down and out of the lower end of the tube.

In FIG. 3 the casing 12 is disposed with its axis upright and is frusto conical, while the insulated helical blade 16 tapers correspondingly, thereby compensating for a reduction in the volume of the sludge caused by the removal of water, and so maintaining efficient operation is maintained.

In FIG. 4 the insulated helical blade 16 has apertures 23 therein to provide for water drainage by gravity.

In FIG. 5 the perforated tube 15 is surrounded by a cylindrical screening sleeve 24 of variable or fixed mesh size, to assist in the filtration of the sludge. The sleeve may be removably mounted on the tube to enable its replacement.

In FIG. 6 the dewatering apparatus includes a sedimentation tank 26 having a lower sludge inlet 27, an upper supernatant fluid outlet 28, and solids outlet 29; and a plurality of dewatering units 25, as embodied in any one of FIGS. 2 to 5, disposed in the tank with their axes upright.

In FIG. 7, an electrode device in the form of an endless belt conveyor 51 is housed in a casing 50 which is shaped to conform with the conveyor and has a sludge inlet opening 52 and a solids outlet opening 53. The conveyor 51 includes a rotary wall in the form of an endless belt 51A having perforations 51B and extending around driving shafts 55, and a series of outwardly projecting blades 54 are carried by the belt so as to be driven thereby and are electrically insulated from the belt and cooperate with the casing walls to move the sludge in a U-path through the casing between inlet opening 52 and outlet opening 53 tending to prevent accumulation of dry solids on the casing walls. An electrical circuit connected to the casing and belt is indicated at 56. The water separated from the solids by electro-osmosis flows through the perforations 51B into the space enclosed by the belt, and thence through an opening 57 in a side wall of the casing.

Many further modifications may be made, for example, the electrode device may comprise a plastic drain pipe with a perforated wire gauze covering which can be replaced when corroded, and the helical blade may be of any suitable electrical insulating material.

In the event that the casing is of non-conducting material an electricity-conducting sleeve is inserted in the casing to act as anode and to form a composite wall with the casing wall.

In all embodiments, when the sludge initially contains a high percentage of water, it is preferable to leave the sludge in tanks so that initial separation, of the water by gravity may take place before the electro-osmotic dewatering is effected.

Furthermore, the operation may be improved if a vacuum is applied to the hollow electrode device, and the casing may be constructed of selections electrically insulated from one another so that a potential gradient may be applied from end to end of the casing the potential being applied to each section in accordance with the percentage of water in the sludge at that section.

I claim:

1. Apparatus for use in dewatering sludge comprising an elongated electrode casing having inlet and outlet openings therein, a hollow elongated electrode device extending within the casing and including a rotary wall defining with an opposed wall of the casing an elongated through-passage for sludge, the rotary wall having perforations therein to permit flow of water from the sludge into the hollow of the device for discharge from the hollow, and blading carried by the rotary wall so as to be driven thereby to convey sludge through the passage from inlet opening to outlet opening, the rotary wall and the opposed wall being adapted to serve respectively as cathode and anode and being electrically insulated from each other so that on applying a difference in electrical potential across the passage there is an electro-osmotic flow of water from the sludge through the perforations of the rotary wall during movement of the sludge through the passage, and the driven blading prevents the accumulation of dry solids on the opposed wall.

2. Apparatus according to claim 1, wherein the elongated electrode casing is tubular and has the inlet and outlet openings at its respective ends, the electrode device includes a tube mounted for rotation on its axis and having the perforations in its wall, and the blading is a helical blade carried co-axially by the tube for rotation therewith, and electrically insulated therefrom.

3. Apparatus according to claim 2, wherein the blade and the casing bore taper toward the outlet end of the casing.

4. Apparatus according to claim 2, wherein the electrode device includes a cylindrical screening sleeve surrounding the tube.

5. Apparatus according to claim 2, wherein the casing is disposed with its axis upright and the outlet opening is the open upper end of the casing, and the electrode device includes an annular receptacle surrounding said outlet opening to receive sludge solids therefrom, a discharge opening in the receptacle floor, and a rotary scraper in the receptacle in driving connection with the rotary tube to sweep the solids to the opening and discharge therethrough.

6. Apparatus according to claim 5, wherein apertures for gravity drainage of water are formed in the helical blade.

References Cited

UNITED STATES PATENTS

| | | | |
|---|---|---|---|
| 689,674 | 12/1901 | Irwin | 204—202 |
| 894,070 | 7/1908 | Schwerin | 204—180 |
| 1,174,946 | 3/1916 | Illig | 204—300 |
| 2,057,156 | 10/1936 | Lyons | 204—180 |

JOHN H. MACK, Primary Examiner

A. C. PRESCOTT, Assistant Examiner

U.S. Cl. X.R.

204—149, 180